United States Patent
Schenk

(10) Patent No.: US 6,714,613 B2
(45) Date of Patent: Mar. 30, 2004

(54) APPARATUS AND METHOD FOR CONTROLLING THE SAMPLING CLOCK IN A DATA TRANSMISSION SYSTEM

(75) Inventor: Heinrich Schenk, München (DE)

(73) Assignee: Infineon Technologies AG, Munich (DE)

( * ) Notice: Subject to any disclaimer, the term of this patent is extended or adjusted under 35 U.S.C. 154(b) by 233 days.

(21) Appl. No.: 09/815,652

(22) Filed: Mar. 23, 2001

(65) Prior Publication Data

US 2001/0021235 A1 Sep. 13, 2001

(51) Int. Cl.$^7$ ................................................ H04L 7/00
(52) U.S. Cl. ...................... 375/368; 375/355; 375/365
(58) Field of Search .............................. 375/354, 355, 375/362, 365, 368, 257, 324, 340, 326, 344, 346, 350

(56) References Cited

U.S. PATENT DOCUMENTS

| | | | |
|---|---|---|---|
| 4,995,031 A | | 2/1991 | Aly et al. |
| 5,065,412 A | | 11/1991 | Schenk |
| 5,097,488 A | * | 3/1992 | Kokubo et al. ............. 375/354 |
| 5,666,386 A | * | 9/1997 | Masuda ...................... 375/355 |
| 6,101,230 A | * | 8/2000 | Chun et al. ................. 375/355 |

FOREIGN PATENT DOCUMENTS

EP      0 316 876 A2      5/1989

OTHER PUBLICATIONS

Volker Hespelt et al.: Zur Synchronisation des Empfängers für den ISDN Basisanschluss [synchronization of the receiver for an ISDN–basic connection], *ANT Nachrichtentechnische Berichte*, No. 5, 1988, pp. 40–49.

Egbert Hechler et al.: ISDN–U–Schnittstellenbausteine: IBC und IEC [ISDN–U–interface components: IBC and IEC], *Elektronik*, No. 5, Mar. 3, 1989, pp. 120–128.

\* cited by examiner

*Primary Examiner*—Betsy L. Deppe
(74) *Attorney, Agent, or Firm*—Laurence A. Greenberg; Werner H. Stemer; Gregory L. Mayback

(57) ABSTRACT

A device and method for regulating a sampling rate in a digital data transfer system includes transmitting a synchronizing word used for receiver-side regulation of the sampling rate at regular time intervals. The received signal is filtered by a rate-regulating criterion filter and is simultaneously detected to recognize the synchronizing word. The initial value of the rate-regulating criterion filter controls an adjusting logic for the sampling rate once the synchronizing word is recognized. A rate is formed for the initial value of the rate-regulating criterion filter and the rate undergoes high pass filtering before it is fed to the adjusting logic. An apparatus for controlling the sampling includes a clock control criterion filter, an adjustment logic device, a switch, an apparatus identifying the synchronization word, a magnitude formation circuit, and a high-pass filter. The formation circuit and the high-pass filter are disposed between the criterion filter and the logic device.

10 Claims, 15 Drawing Sheets

FIG 2
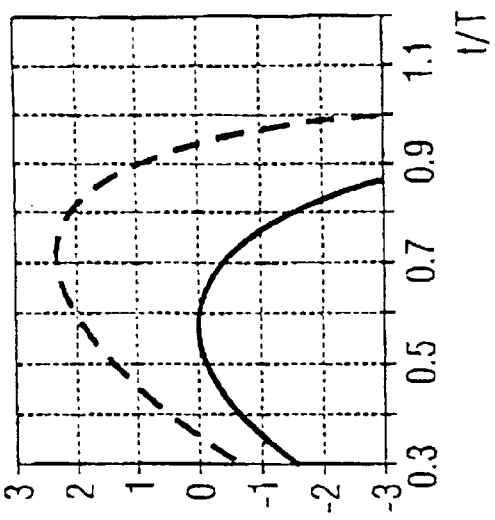
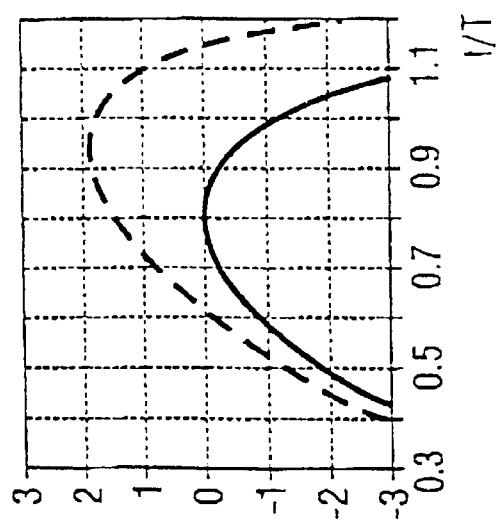
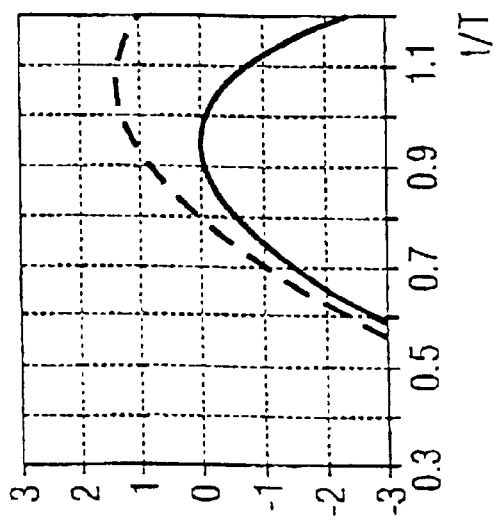

a: $TRK(z) = (1-z^{-1})5(1-z^{-2})(1-1,25z^{-1})$
b: $TRK(z) = (1-z^{-1})3(1-z^{-2})2(1-2,0z^{-1})$
c: $TRK(z) = (1-z^{-1})2(1-z^{-2})2(1-0,5z^{-1})$

APPARATUS AND METHOD FOR CONTROLLING THE SAMPLING CLOCK IN A DATA TRANSMISSION SYSTEM

CROSS REFERENCE TO RELATED APPLICATION

This application is a continuation of copending International Application No. PCT/DE99/02758, filed Sep. 1, 1999, which designated the United States.

BACKGROUND OF THE INVENTION

Field of the Invention

The present invention relates to an apparatus and a method for controlling the sampling clock in a digital data transmission system. A synchronization word is transmitted at regular time intervals, by which the sampling clock at the receiving end is controlled. The received, sampled and filtered signal is supplied to a click control criterion filter and to an apparatus for identification of the synchronization word. The apparatus actuates a switch that supplies the clock control criterion to an adjustment logic device for the sampling clock (symbol clock).

The apparatus according to the invention and the method according to the invention are preferably intended for ISDN baseband subscriber connections.

In ISDN connection technology, baseband transmission methods (PAMP=pulse amplitude modulation, key word: 4B3T, 2R1Q) are used at the U-interface, with an unencrypted synchronization word being transmitted at regular time intervals for synchronization. The synchronization word is used to recover the frame structure (2×B+E—channels) once again at the receiving end. However, the control of the sampling clock at the receiving end can also be derived therefrom. The invention is based, as the prior art, on the present PRE 2091 and PRE 24911 (IRC-Q) U-module from the applicant.

The U-module provides clock control that derives the clock information from the received synchronization word.

SUMMARY OF THE INVENTION

It is accordingly an object of the invention to provide an apparatus and method for controlling the sampling clock in a data transmission system that overcomes the hereinafore-mentioned disadvantages of the heretofore-known devices and methods of this general type and that further reduces the phase jitter on the symbol clock resulting from external and internal discrepancies and, at the same time, sets the symbol clock to the optimum sampling time in terms of achieving an error probability in response to random noise at the input that is as low as possible.

With the foregoing and other objects in view, there is provided, in accordance with the invention, an apparatus for controlling a sampling clock in a digital data transmission system including a clock control criterion filter for filtering a received, sampled, and filtered signal, an adjustment logic device, a switch supplying a clock control criterion to the adjustment logic device for a sampling clock, an apparatus for identification of a synchronization word transmitted at regular time intervals and for receiving the received, sampled, and filtered signal, the apparatus programmed to actuate the switch for controlling the sampling clock at a receiving end of a digital data transmission system, a magnitude formation circuit, and a high-pass filter, the magnitude formation circuit and the high-pass filter disposed between the clock control criterion filter and the adjustment logic device.

The objectives of the invention are achieved in that, in the case of the apparatus according to the prior art, a magnitude formation circuit and a high-pass filter are disposed between the clock control criterion filter and the adjustment logic device for the symbol clock. Furthermore, according to the invention, the objectives are achieved by a method according to the prior art in which, in addition, the magnitude of the output value of the clock control criterion filter is formed, and is subjected to high-pass filtering before being supplied to the adjustment logic device.

With the objects of the invention in view, there is also provided a method for controlling a sampling clock in a digital data transmission system, including the steps of transmitting a synchronization word at regular time intervals, controlling a sampling clock at a receiving end of a digital data transmission system by the transmission of the synchronization word, filtering a received, sampled, and filtered signal with a clock control criterion filter and, at the same time, subjecting the received, sampled, and filtered signal to a detection method for identification of the synchronization word, controlling an adjustment logic device for a sampling clock on identification of a synchronization word with an output value of the clock control criterion filter, and forming a magnitude of the output value of the clock control criterion filter and subjecting the magnitude to high-pass filtering before supplying the magnitude to the adjustment logic device.

In accordance with another feature of the invention, it is particularly preferable for the transfer function of the high-pass filter or high-pass filtering to be $(1-z^{-1})$.

In accordance with a concomitant feature of the invention, $(1-z^{-1})^5 * (1-z^{-2}) * (1-k_0, z^{-1})$ is preferably chosen as the transfer function for the clock control criterion filter. It is particularly preferable to choose $k_0=-\frac{3}{8}$ for short lines and $k_0=+\frac{1}{8}$ for long lines. The definition of "short" and "long" lines corresponds to the normal definition of these parameters in the prior art.

Other features that are considered as characteristic for the invention are set forth in the appended claims.

Although the invention is illustrated and described herein as embodied in an apparatus and method for controlling the sampling clock in a data transmission system, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 2 are graphs of the signal-to-noise ratios as a function of the sampling phase;

DESCRIPTION OF THE PREFERRED EMBODIMENTS

Figure 1:
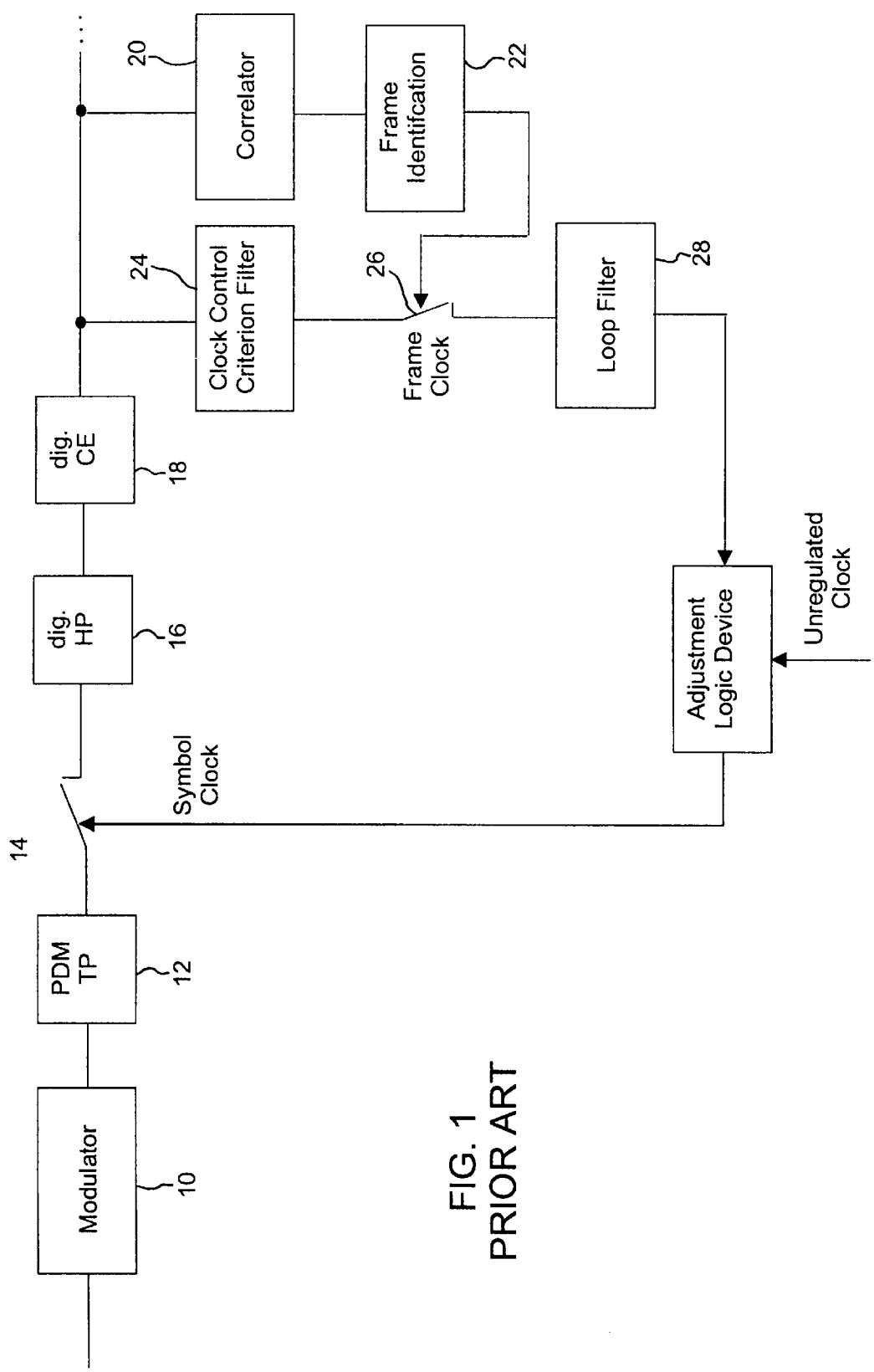
FIG. 1 is a block circuit diagram of a clock control loop according to the prior art.

In all the figures of the drawing, sub-features and integral parts that correspond to one another bear the same reference symbol in each case.

Based on the receiver structure used in the Siemens IEC-Q, the optimum sampling phase, both with and without a noise predictor, is determined in the following text, first of all for various line lengths. Based on the analysis of the previously used clock control criterion, the resultant error from the optimum sampling phase and the signal-to-noise loss resulting therefrom are specified as a function of the line length. It is shown that parameter switching for the clock control criterion filter based on the line length is worthwhile to achieve system characteristics that are as good as possible for all line lengths—as is already implemented in the present TEC-Q.

According to the invention, a modified configuration is specified to achieve a clock control criterion by which both the external disturbance signal injected at the receiver input as well as the internal disturbance signals (for example, caused by quantization or incomplete echo compensation) have considerably less influence on the clock control criterion. The proposed solution results in an improvement of about 9 dB. Accordingly, a better clock control loop response is achieved with regard to intrinsic jitter and the jitter frequency response.

In ISDN transmission technology, synchronization information in the form of a synchronization word is transmitted at regular time intervals. In the technology based on the 2B1Q line code, the synchronization word includes nine symbols and is repeated after every 120 transmitted symbols. The Uk0 frame defined by the synchronization word thus has a duration of $$\frac{120}{8000\frac{\text{symbols}}{s}} = 1.5 \text{ ms.}$$

The synchronization word includes the following symbols:

+3+3−3−3−3+3−3+3+3.

Correlation of the received signal with the synchronization word allows the position of the received synchronization word to be determined from the distorted received signal, thus, allowing the frame clock to be regenerated.

The synchronization word can also be used to control the received clock phase. As such, it is advantageous for the clock phase control to be independent of the equalizer status. In the case of clock control systems with decision feedback, such independence does not exist, and the convergence can be adversely affected by incorrect decisions relating to data regeneration. If the synchronization word is used for clock recovery, then, after suitable filtering and sampling, the received signal must first of all be passed on in time with the frame clock within a precisely defined symbol position to the clock control loop. Once the position of the synchronization word has been identified with the aid of a specific frame identification device, the position for sampling the control criterion within the frame is defined precisely.

The transfer function for the clock control criterion filter must be defined such that the output signal has a zero crossing at the sampling time. The zero crossing represents the control characteristic.

Referring now to the figures of the drawings in detail and first, particularly to FIG. 1 thereof, there is shown a block diagram of the clock control system considered here.

First of all, the input signal is supplied to a sigma-delta modulator 10. From there, it is passed to a pulse duration modulation low-pass filter 12. The signal is sampled at the symbol clock rate by a sampling switch 14, and is then supplied to a digital high-pass filter 16. From there, the signal is passed on to a digital compromise equalizer 18. The output of the digital compromise equalizer 18 then leads to a decision maker, which recovers the digital data from the signal. The output signal from the digital compromise equalizer 18 is, however, also supplied through a correlator 20 to the frame identification 22, which re-establishes the frame clock. The output value from the digital compromise equalizer 18 is furthermore also supplied to the clock control criterion filter 24. Its output values are sampled by a sampling switch 26 using the frame clock from the frame identification 22. The output signal (sampled using the frame clock) from the clock control criterion filter is supplied through a loop filter 28 to the adjustment logic device 30, which shifts the unregulated clock such that it corresponds to the optimum symbol clock for sampling the input signal. The symbol clock controls the sampling switch 14.

The clock control criterion filter 24 has the task of generating from the received signal a suitable signal for control of the sampling time. The signal should satisfy the following three conditions as well as possible:

a) Zero crossing at the "optimum" sampling time independently of the line used; optimum with respect to the error probability with random disturbances at the input being as low as possible;

b) the noise signal injected at the input of the clock control criterion filter 24 should—taking account of the gradient of the control characteristic—be superimposed to as little an extent as possible on the clock control criterion at the output of the filter 24 to minimize the phase jitter caused by external and internal disturbances; and c) the crosstalk caused by the stochastic data transmitted before and after the synchronization word should be as low as possible at the zero crossing of the control criterion to produce as little intrinsic jitter as possible.

The sampling phase is optimum when the number of symbols for which incorrect decisions are made in the receiver is a minimum. If the distribution of the disturbance signals is gaussian, the error probability can be calculated analytically provided that power or the root mean square value of the noise signal and the residual error of the equalized useful signal are known. Both variables depend on the position of the sampling time due to the relationship with the preshoot equalizer (linear equalizer).

The resultant signal-to-noise ratio at the decision maker input as a function of the sampling phase can be defined as the object function, which also needs to be normalized to a fixed noise power at the input.

When a noise predictor is used, in the assessment of the optimum sampling phase, its influence on the signal-to-noise ratio must also be taken into account because the signal-to-noise gain is likewise dependent on the sampling phase due to the noise predictor. Taking account of the digital high-pass filter 16 with the transfer function:

$$H_{HP}(z) = \frac{1-z^{-1}}{1-0.5 \cdot z^{-1}}$$

and the compromise equalizer 18 with the transfer function:

$$H_{KEZ}(z) = \frac{-\frac{1}{8}+z^{-1}}{1+\frac{1}{4} \cdot z^{-1}},$$

the profiles illustrated in FIG. 2 results for the signal-to-noise ratios as a function of the sampling phase. The sampling phases are related to the time of the maximum impulse response downstream from the compromise equalizer 18, and the signal-to-noise profiles are related to the optimum sampling time without the noise predictor. A spectrum determined based on the measured disturbance signals (ANSI loop 1) is used as the basis of the disturbance spectrum, taking account not only of the noise signal caused by the sigma delta modulator 10 but also on the modeled crosstalk signal (margin=0 dB).

FIG. 2 shows the signal-to-noise ratios with and without a noise predictor. The left-hand diagram relates to a 0 km line, the central diagram to a 3 km line of the AWG 26 type, and the right-hand diagram to a 5.5 km line of the AWG 26 type. The solid line shows the profile without a noise predictor, and the dashed line the profile with a noise predictor. The sampling time is related to the time of optimum sampling without a noise predictor, and the noise predictor is assumed with two coefficients.

Figure 3:
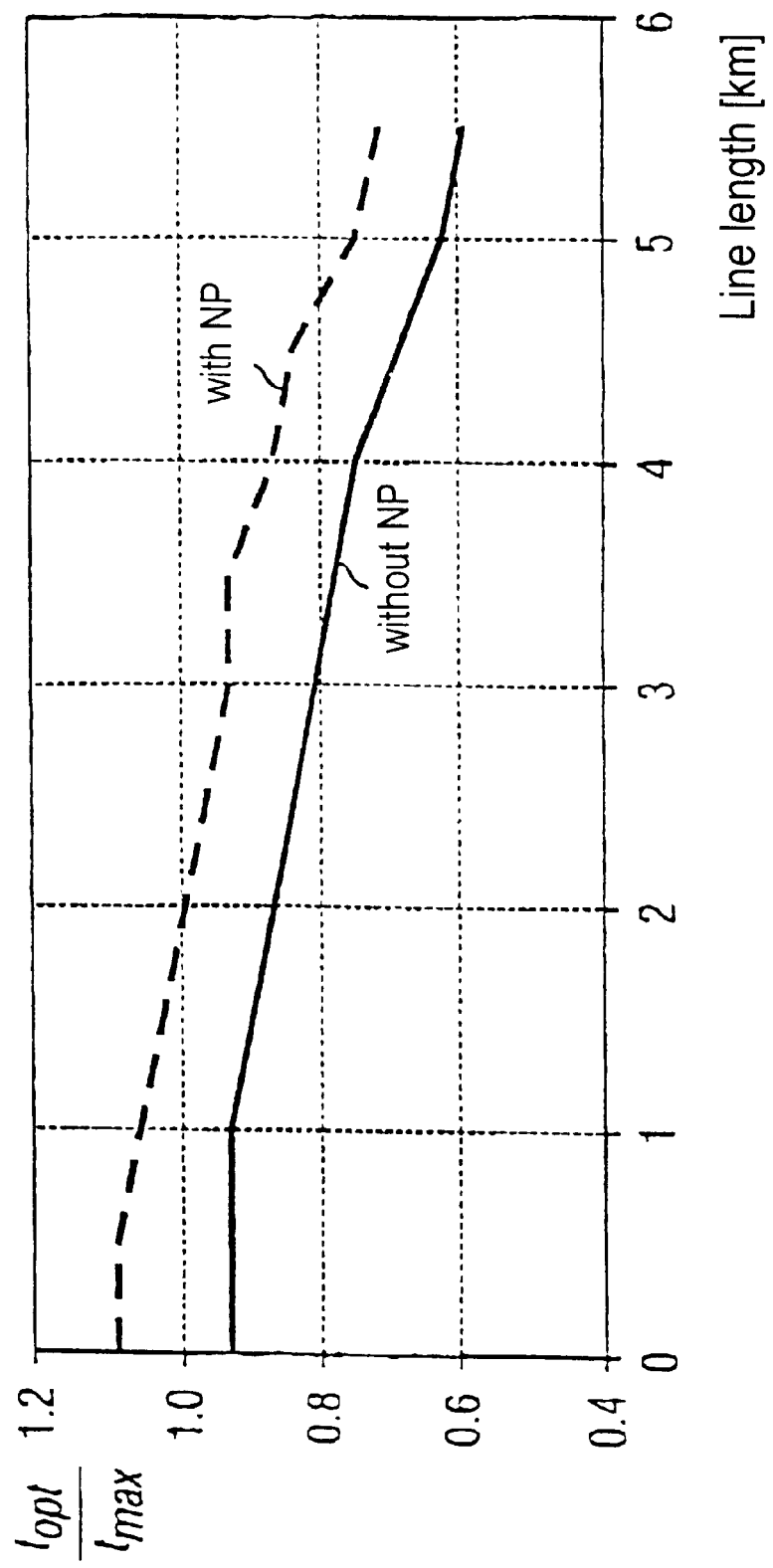
FIG. 3 is a graph of a position of the optimum sampling time related to the timing of the pulse maximum downstream from the compromise equalizer, as a function of the line length.

The following fundamental relationships can be seen from FIG. 2:

a) As the line length increases, the optimum sampling time moves further away from the time of the pulse maximum (see also FIG. 3);

b) When using a noise predictor, the optimum sampling time is located closer to the time of the pulse maximum; and c) The achievable signal-to-noise gain is greater for longer lines than for shorter lines due to the noise predictor.

In general, it can be stated that, to achieve noise characteristics that are as good as possible regardless of the line length, a sampling phase should be chosen that should not differ the optimum sampling time by more than about ±10% of the symbol clock rate.

The relationship described in a) between increasing line length and the distance between the optimum sampling time and the time of the pulse maximum is, once again, shown in FIG. 3. FIG. 3 shows the position of the optimum sampling time related to the timing of the pulse maximum downstream from the compromise equalizer 18 as a function of the line length, once again with a type AWG 26 line being assumed. The solid line shows the relationships without a noise predictor, and the dashed line with a noise predictor.

A clock control criterion as is used in the present IRC-Q module will be investigated in more detail in the following text. The clock control criterion filter 24 has the following transfer function:

$$TRK(z)=(1-z^{-1})^5 \cdot (1-z^{-2}) \cdot (1-k_0 \cdot z^{-1})$$

Figure 4:
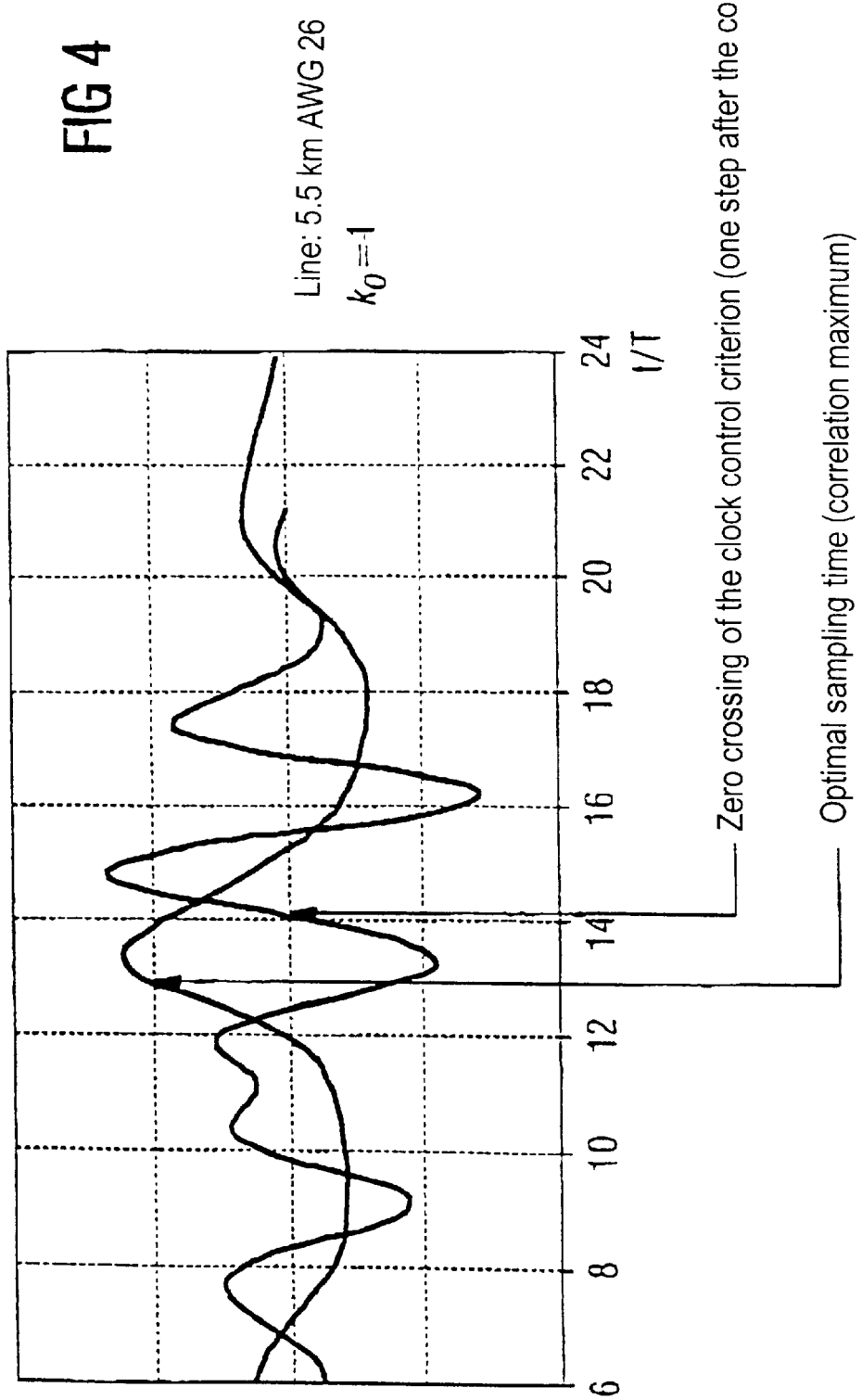
FIG. 4 is a graph of a correlation sum and clock control criterion.

The parameter $k_0$ is chosen to be 0.5 for short lines and 1.0 for long lines. To illustrate the control characteristic, FIG. 4 shows the signal at the output of the correlator, and the corresponding signal at the output of the clock control criterion filter 24. Only the reaction to the transmitted synchronization word is shown, with the transmitted data being set to zero. It can clearly be seen that the desired zero crossing of the clock control criterion occurs precisely one step interval after the correlation maximum, and the zero crossing is located only slightly away from the optimum sampling time for the line.

In FIG. 4, the optimum sampling phase corresponds to the grid network, a 5.5 kilometer long line of the AWG 26 type is used, and the parameter k, is set to 1.0.

Figure 5:
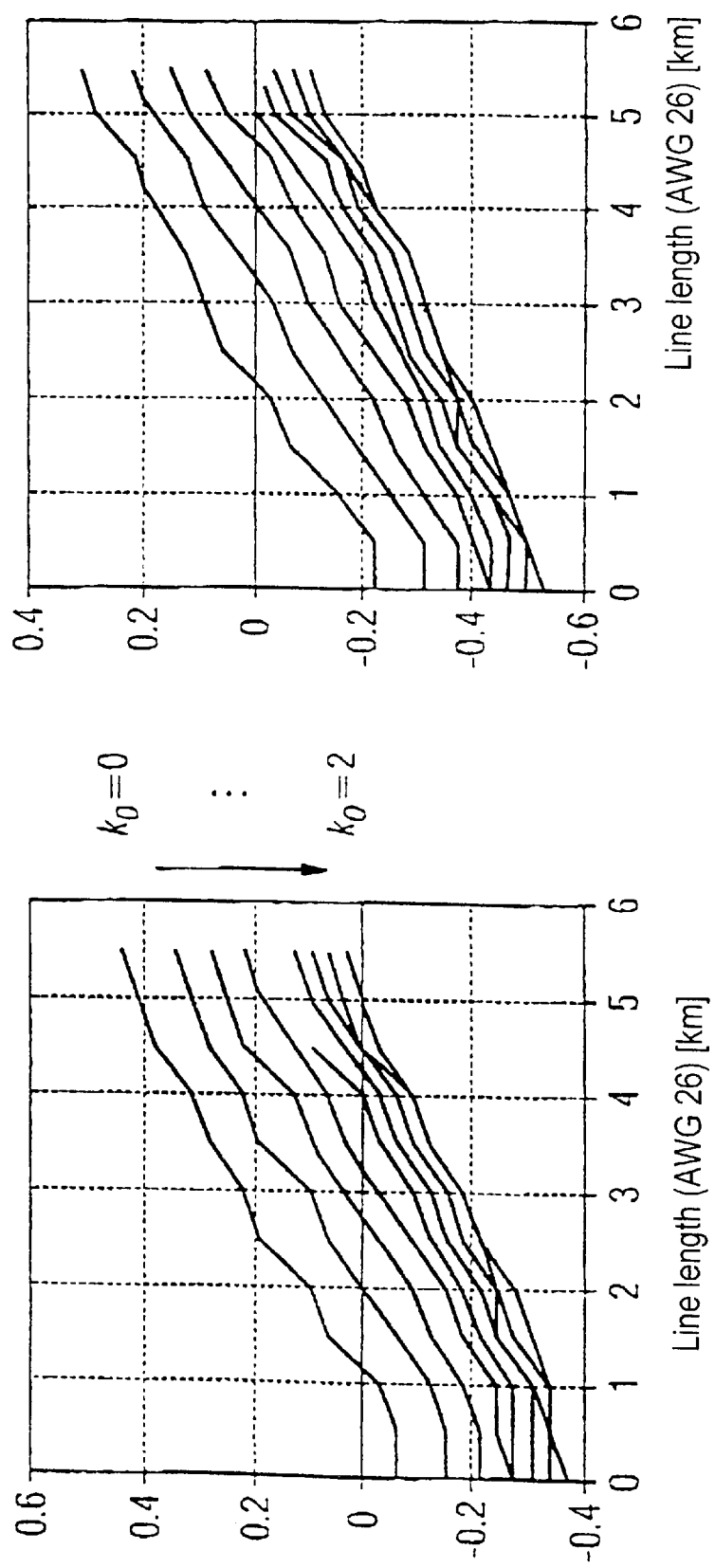
FIG. 5 are graphs showing the error in the zero crossing from the optimum sampling phase as a function of the line length.

The influence of the parameter $k_0$, on the position of the sampling time and, thus, on the system response will now be investigated, in general form. The difference between the zero crossing and the optimum phase angle will be calculated for various line lengths (AWG 26) and for various values of $k_0$ ($k_0$=0 to $k_0$=2). FIG. 5 shows the differences, based firstly on the values without and secondly with consideration of the noise predictor (two coefficients) for the optimum sampling times. The profiles, which are not entirely smooth, are due to the relatively coarse quantization (T/32) both in the calculation of the optimum sampling times and in the zero crossings of the clock control criterion.

The left-hand diagram in FIG. 5 shows the relationships without a noise predictor, and the diagram on the right with a noise predictor.

The following fundamental characteristics can be seen from FIG. 5.

As the value of $k_0$ increases, the zero crossing moves further away from the time of the pulse maximum. The difference between the zero crossing and the optimum sampling time decreases for longer lines with a higher $k_0$ value and for shorter lines with a lower $k_0$ value.

Because the optimum sampling time when using a noise predictor is somewhat closer to the time of the pulse maximum, somewhat lower $k_0$ values are required to achieve a sampling time that is as optimum as possible.

Figure 6:
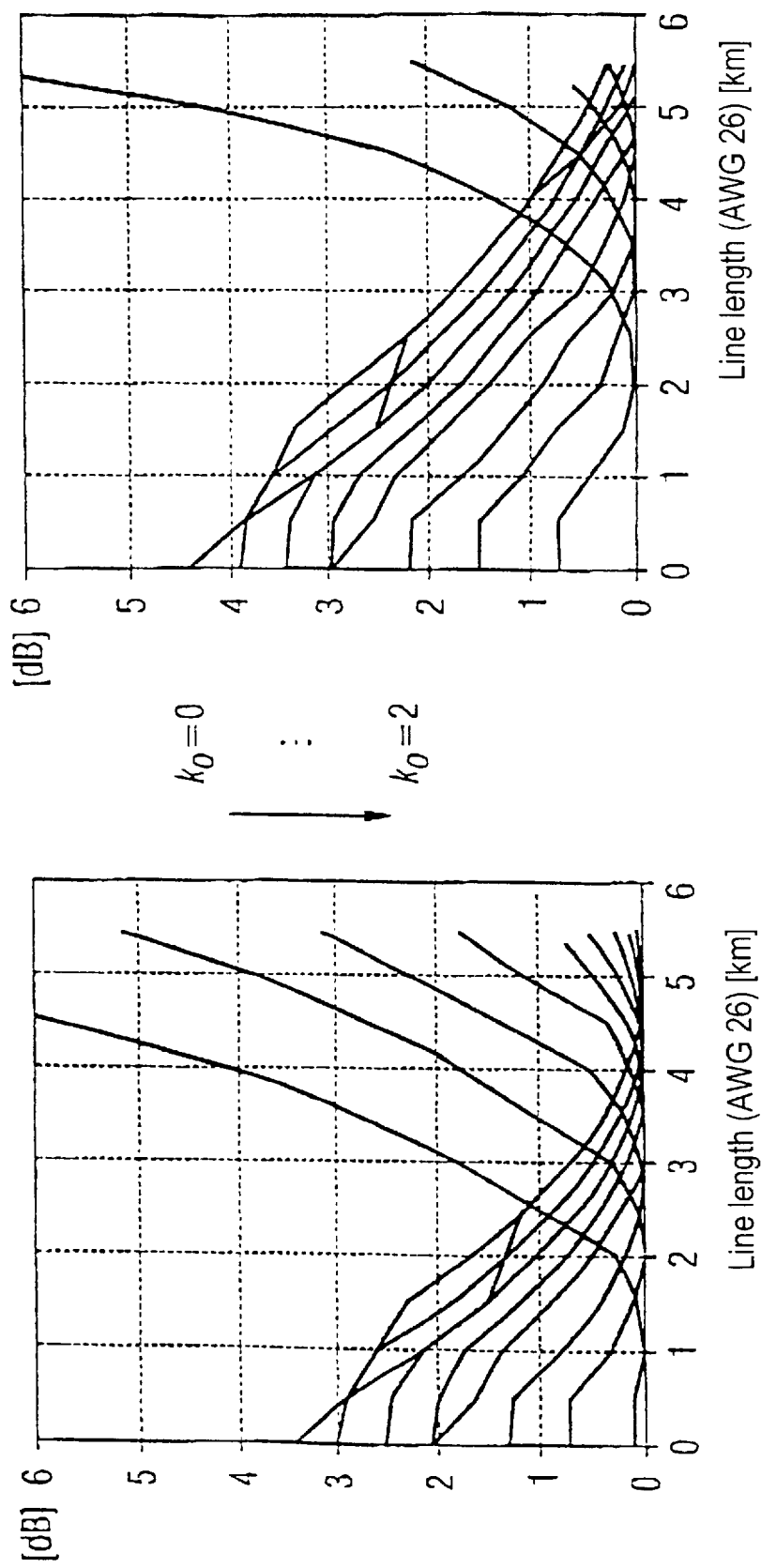
FIG. 6 are graphs showing the signal-to-noise loss upstream of the decision maker as a function of the line length.

FIG. 6 shows the influence of the parameter k, on the signal-to-noise ratio as a function of the line length, both with and without a noise predictor. The left-hand diagram, once again, shows the relationships without a noise predictor, and the diagram on the right shows the relationships with a noise predictor. It can seen that it is impossible to achieve equally good sampling times for all line lengths with a fixed parameter $k_0$. In the first version of the IEC-Q, $k_0$ was chosen to be 0.5. The selection represents a compromise when intending to cover all conceivable operational situations with a single $k_0$ value. However, for extremely long lines (for example, 5.5 km in FIG. 6), without a noise predictor, the selection results in a deterioration in the signal-to-noise ratio in comparison to a system with an optimum sampling phase of about 3 dB, and at deterioration of about 1 dB with a noise predictor. To improve the response, two different $k_0$ values are used in the present version of the IEC-Q, to be precise $k_0=0.5$ for shorter lines and $k_0=1$ for longer lines. The switching is carried out using the logic RANGE signal, through which the sensitivity of the A/D converter is switched for longer lines, for example, in the range from 3 to 4 km. More detailed analysis shows that a somewhat better system response can be achieved using $k_0=0.25$ for short lines and $k_0=1.25$ for long lines.

The noise signal injected at the input of the receiver passes through the PDM low-pass filter 12, the digital high-pass filter 16, and the digital compromise equalizer 18 to the clock control criterion filter 24. The noise is assessed in the filter 24 using the transfer function of the clock control criterion, and is superimposed on the controlled variable. The aim must be to keep the noise as low as possible for a given gradient of the control criterion at the zero crossing. If approximately white noise is assumed with a noise power density $R_0$ at the receiver input, then the noise power at the output of the clock control criterion filter 24 is given by:

$$R = R_0 \cdot \int_0^{f_2} |H_{PDM}(f)|^2 \cdot |H_{PF}(f)|^2 \cdot |H_{KEZ}(f)| \cdot |TRK(f)|^2 \cdot df.$$

The variable $$F = \frac{S}{\sqrt{\frac{R}{R_0}}}$$

can be used as a criterion for assessing the system in terms of noise injection into the clock control loop, where S denotes the gradient of the control criterion at the zero crossing.

A number of possible transfer functions for the noise response will now be investigated in more detail. The functions are constructed such that the zero crossing for a line length of 5.5 km (AWG 26 line) occurs approximately at the optimum sampling time. A transfer function in the form:

$$TRK(z)=(1-z^{-1})^n \cdot (1-z^{-1})^m (1-k_0 z^{-1})$$

is used as the basis for the clock control criterion.

Table 1 shows the noise improvements that can be achieved for two further possible transfer functions. The transfer function recommended above, with n=5, m=1 and $k_0=1.25$, is used as a reference value. The other transfer functions shown are, in principle, suitable for controlling the sampling clock. In addition to the transfer function parameters, Table 1 also shows the position of the zero crossing related to the correlation maximum, and its direction. The objective function related to the transfer function mentioned above is quoted in dB to assess the injected noise. A variable is also quoted that describes the influence of symbol interference, which will be described further below.

It can be seen that the superimposed noise can be reduced by choosing a different transfer function, for example n=2, m=2, $k_0$32 0.5.

TABLE 1

Assessment of various transfer functions in terms of noise and symbol interference.

| N | m | $k_0$ | Position of the zero crossing related to the correlation maximum | Gradient positive/ negative | F related to n = 5 m = 1 and $k_0$ = 1.25 in dB | Symbol interference n at the zero crossing root mean square value gradient at the zero crossing |
|---|---|---|---|---|---|---|
| 5 | 1 | 1.25 | +1 | positive | 0.0 dB | $69.10^{-6}$ |
| 2 | 2 | 0.50 | −1 | positive | 2.9 dB | $70.10^{-6}$ |
| 3 | 2 | 2.00 | 0 | negative | 2.0 dB | $58.10^{-6}$ |

Further transfer functions with different polynomial degrees could be added to Table 1, likewise leading to slightly better injected noise.

Figure 7:
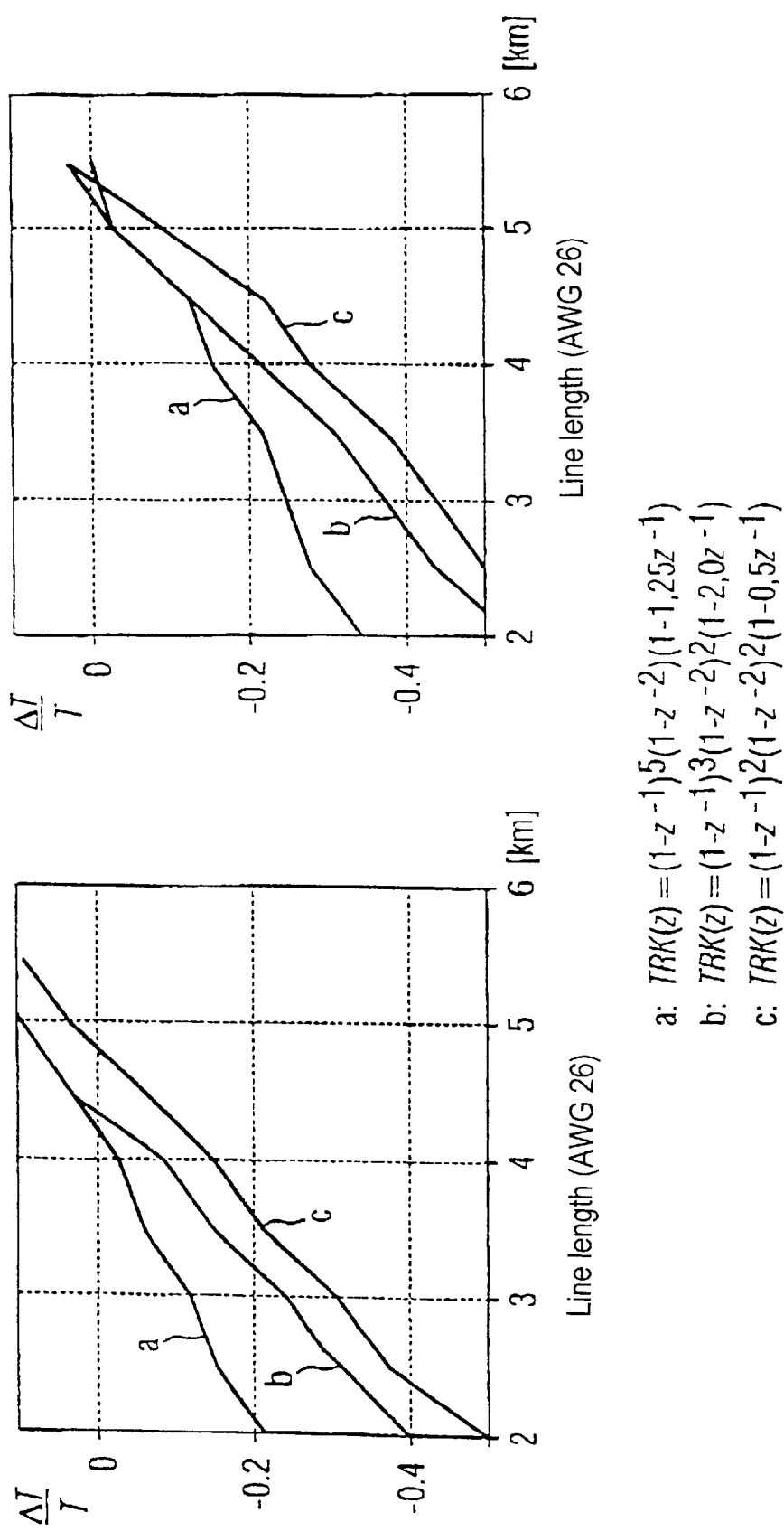
FIG. 7 are graphs showing the error between the zero crossing and the optimum sampling time as a function of the line length for three different clock control criterion transfer functions.
Figure 8:
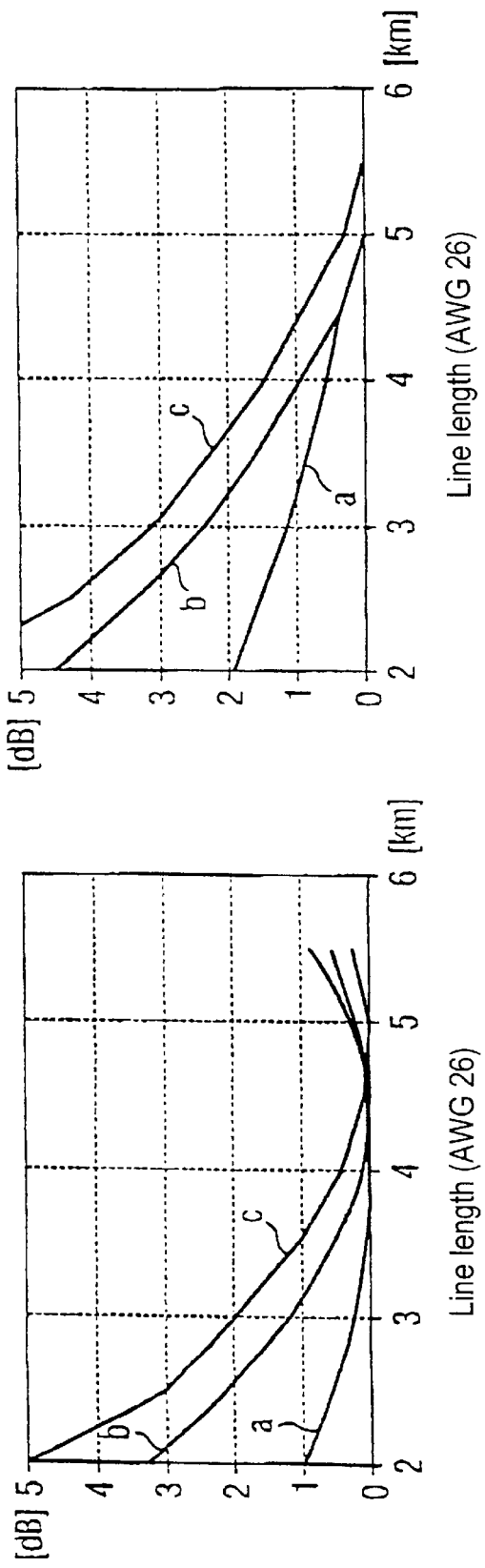
FIG. 8 are graphs showing the signal-to-noise loss upstream of the decision maker as a function of the line length for three different clock control criterion transfer functions.

To assess the usefulness of the clock control criteria stated here, the relationship between the difference between the sampling time and the optimum sampling time and the deterioration in the signal-to-noise ratio is considered as a function of the line length, as is shown in FIGS. 7 and 8.

FIG. 7 shows the movement of the zero crossing from the optimum sampling time as a function of the line length for the three different clock control criterion transfer functions, which are respectively denoted by the letters a, b, c. The relationships without a noise predictor are, once again, shown on the left, and those with a noise predictor on the right.

FIG. 8 shows the signal-to-noise loss upstream of the decision maker as a function of the line length for the three clock control criterion transfer functions a, b and c shown in FIG. 7.

As the transfer function degree increases, and, thus, as the implementation complexity increases, on one hand, the noise gain increases—as can be seen from Table 1. On the other hand, the sensitivity in the position of the sampling time (zero crossing of the control criterion) to changes in the line length decreases. Even if two different clock control criteria are used for short and long lines, the deterioration in the boundary regions for the two low-degree clock control criteria is too high, so that the only possible implementation according to the prior art is the clock criterion with n=5, m=1, and $k_0=1.25$ for long lines, and $k_0=0.25$ for short lines.

The control signal for clock control obtained using the clock control criterion filter 24 is disturbed by crosstalk in the symbols transmitted immediately before and after the synchronization word (symbol interference). These disturbances should also be kept as low as possible to minimize the intrinsic jitter caused by them.

Figure 9:
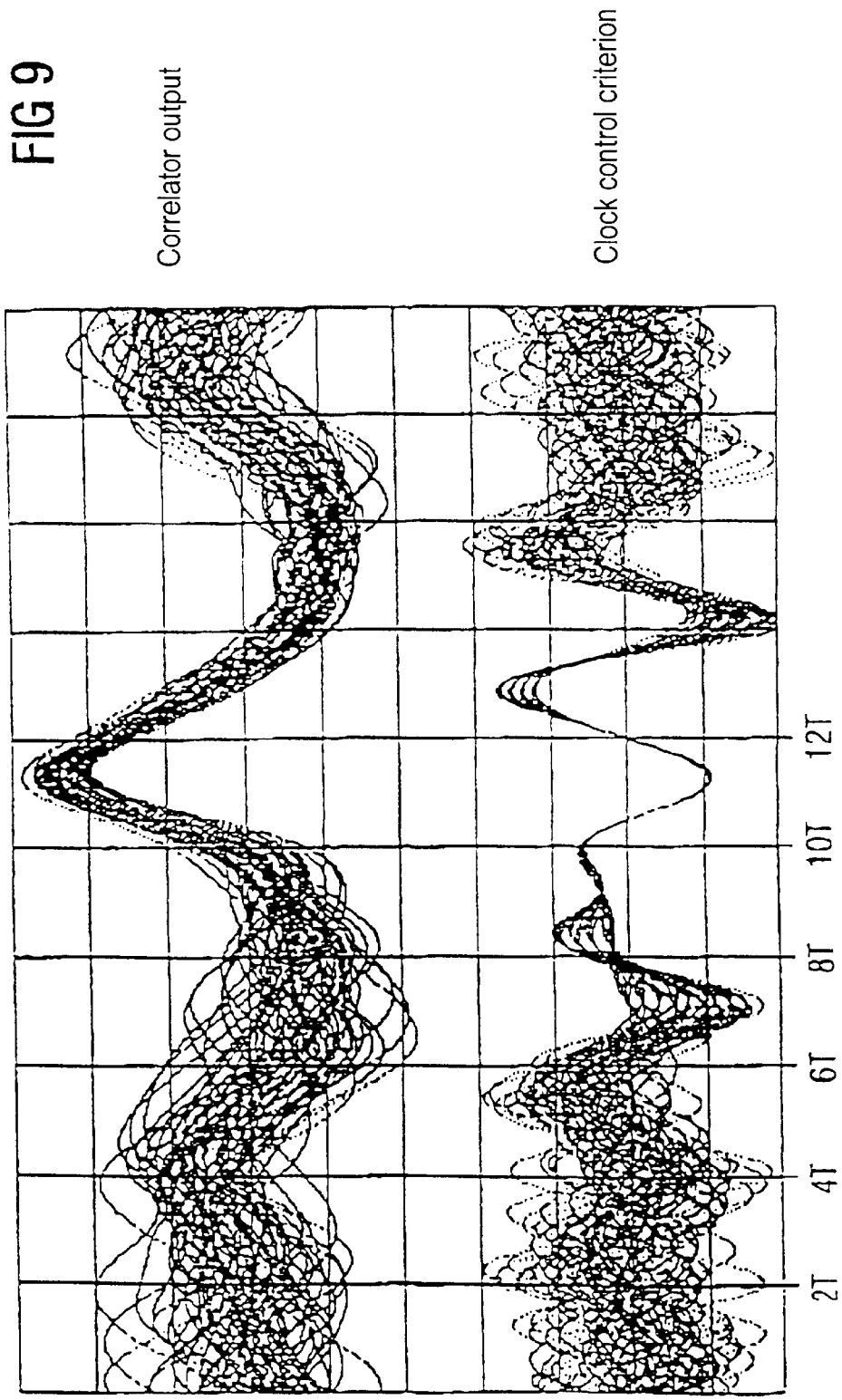
FIG. 9 is a graph of the output values of the correlator and of the clock control criterion for the maximum line length.

FIG. 9 shows both the correlator output and the clock control criterion as a function of the sampling phase, with different frames having been written over one another in synchronism with the transmitted synchronization word. It can be seen that the symbol interference of the clock control criterion at the zero crossing is relatively low with the transfer function used here for the clock control criterion with n=S, m=1, and $k_0=1.25$ and for the line length of 5.5 km (AWG 26) under consideration. The symbol interference will now be considered in somewhat more detail, for quantitative evaluation.

Figure 10:
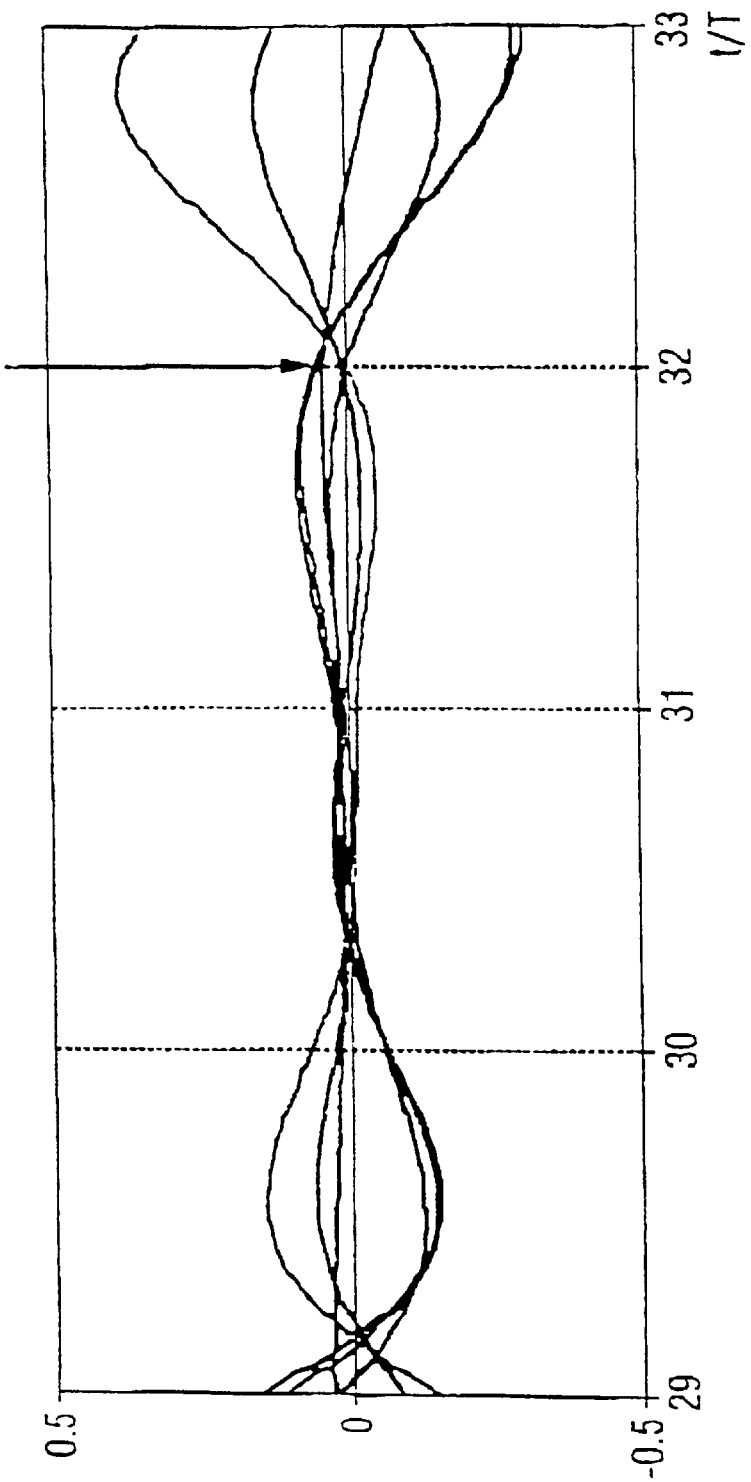
FIG. 10 is a graph of the signal at the output of the clock control criterion filter when the transmitted synchronization word is masked out.

Due to the linearity of the system, the signal downstream from the clock control criterion filter 24 can be made of the reaction of the transmitted synchronization word and a symbol sequence with the synchronization word masked out. The second component then directly represents the component of the disturbing symbol interference. The relationship is shown somewhat more clearly in FIG. 10. The signal produced at the output of the clock criterion control filter is shown for a number of different data sequences, with the transmitted synchronization word having been masked out.

The clock control criterion parameters have, once again, been assumed to be n=5, m=1 and $k_0$=1.25 in this case as well, with an AWG 26 type line with a length of 5.5 km.

Figure 11:
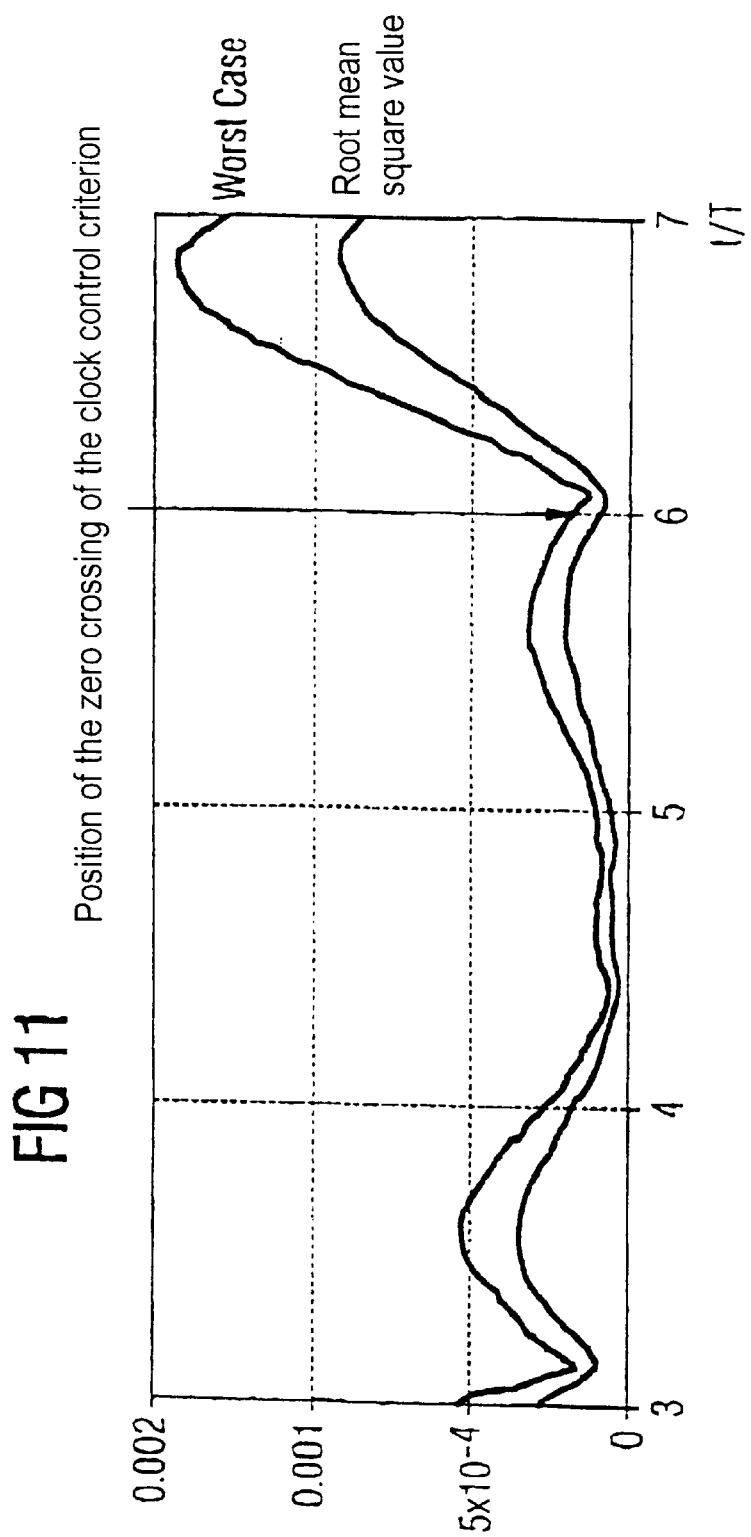
FIG. 11 is a graph showing worst-case values and root mean square values of the crosstalk a function of the sampling phase.

If the impulse response downstream from the clock control criterion filter 24 is known, the influence of symbol interference can be analyzed quantitatively. Both the worst-case values and the root mean square values of the crosstalk can be determined by adding either the magnitudes or the squares of the impulse response values, in which case the impulse response can be assessed respectively using a rectangular window to take account of the transmitted synchronization word that has been masked out. FIG. 11 shows both the profile for the worst-case values and that for the root mean square values of the symbol interference, in each case related to the gradient of the clock control criterion at the zero crossing.

Finally, the two disturbance variables acting on the clock control loop as a result of external and internal disturbance signals and as a result of symbol interference will now be calculated based on an example. For simplicity, only one external disturbance signal is assumed, with a noise power of −55 dBm at the input of the reception high-pass filter. Taking account of the band delimiting by the low-pass filter, this corresponds to the disturbance power quoted in ANSI T1.601. We thus obtain a disturbance voltage at the high-pass filter input 16 with a root mean square value of 0.65 mV, taking into account a terminating impedance of 135 ohms in the conversion. For the control criterion with n=5, m=1 and $k_0$=1.25, and including the high-pass filter 16 and the compromise equalizer, we obtain a noise transfer function of 3169, resulting in a noise voltage at the clock control loop input of about 36.6 mV.

The noise element resulting from symbol interference for the control criterion under consideration and normalized to the gradient of the control characteristic (zero crossing of the clock control criterion) is 69 $\mu$V (see Table 1). The gradient in such a case is about 100, resulting in an overall disturbance voltage of 6.9 mV.

Comparison of the two noise elements shows that, overall, about 96.5% of the total noise power is caused by amplification of the external disturbances, and only about 3.5% by symbol interference. The noise level caused by symbol interference is about 14.5 dB lower than the noise level caused by external disturbances.

Improving the noise transfer function and maximizing the comparative variable F defined above thus has a considerably greater influence on the noise power injected and, thus, on the phase jitter to be expected, than any reduction in the symbol interference.

It has been shown above that, although the injected noise can be reduced by virtually 3 dB by changing the transfer function for the clock control criterion 24 (see Table 1), the implementation option is unsuitable, however, because the sampling phase and the signal-to-noise reduction caused in such a case are heavily dependent on the line length.

Figure 12:
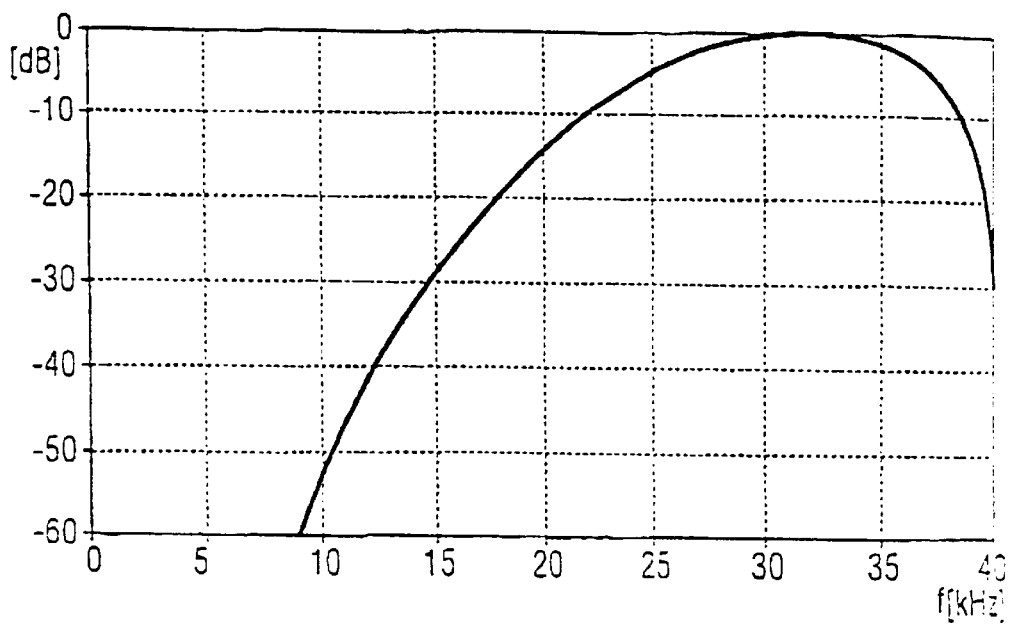
FIG. 12 is a graph showing the attenuation profile of the high-pass filter, the compromise equalizer, and the clock control criterion filter.

Due to the high-pass filtering characteristic of the clock control criterion transfer function, the noise caused by external and internal disturbances results in a noise spectrum that is not white, with very few elements at low frequencies. FIG. 12 shows the attenuation profile of the high-pass filter 16, of the compromise equalizer 18, and of the clock control criterion filter 24. If white noise is injected at the receiver input, the profile corresponds to the profile of the spectral power density of the noise signal superimposed on the clock control criterion.

Figure 13:
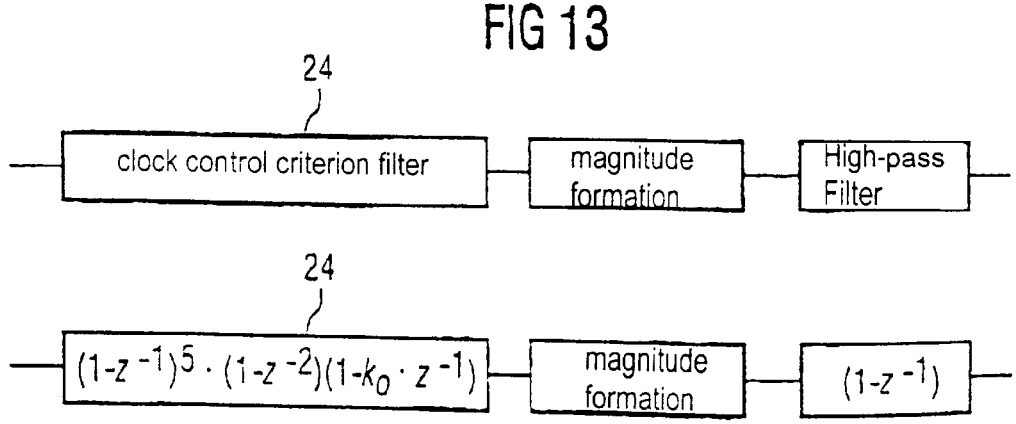
FIG. 13 is a block circuit diagram of a configuration modified according to the invention for determining the clock control criterion.

According to the invention, the noise power can be reduced by generating the magnitude of the signal at the output of the clock control criterion filter, which results in the noise spectrum distribution being changed and its centroid being shifted to low frequencies, followed by high-pass filtering. FIG. 13 shows the block diagram of the configuration according to the invention.

In fact, the parameter $k_0$ must be changed to achieve the same zero crossing as that with the previous configuration. Using the values $k_0$=⅛ for long lines and $k_0$=−⅜ for short lines, we obtain approximately the same relationships as with the previous structure with $k_0$=1.25 and $k_0$=0.25, respectively, for the sampling phase.

Figure 14:
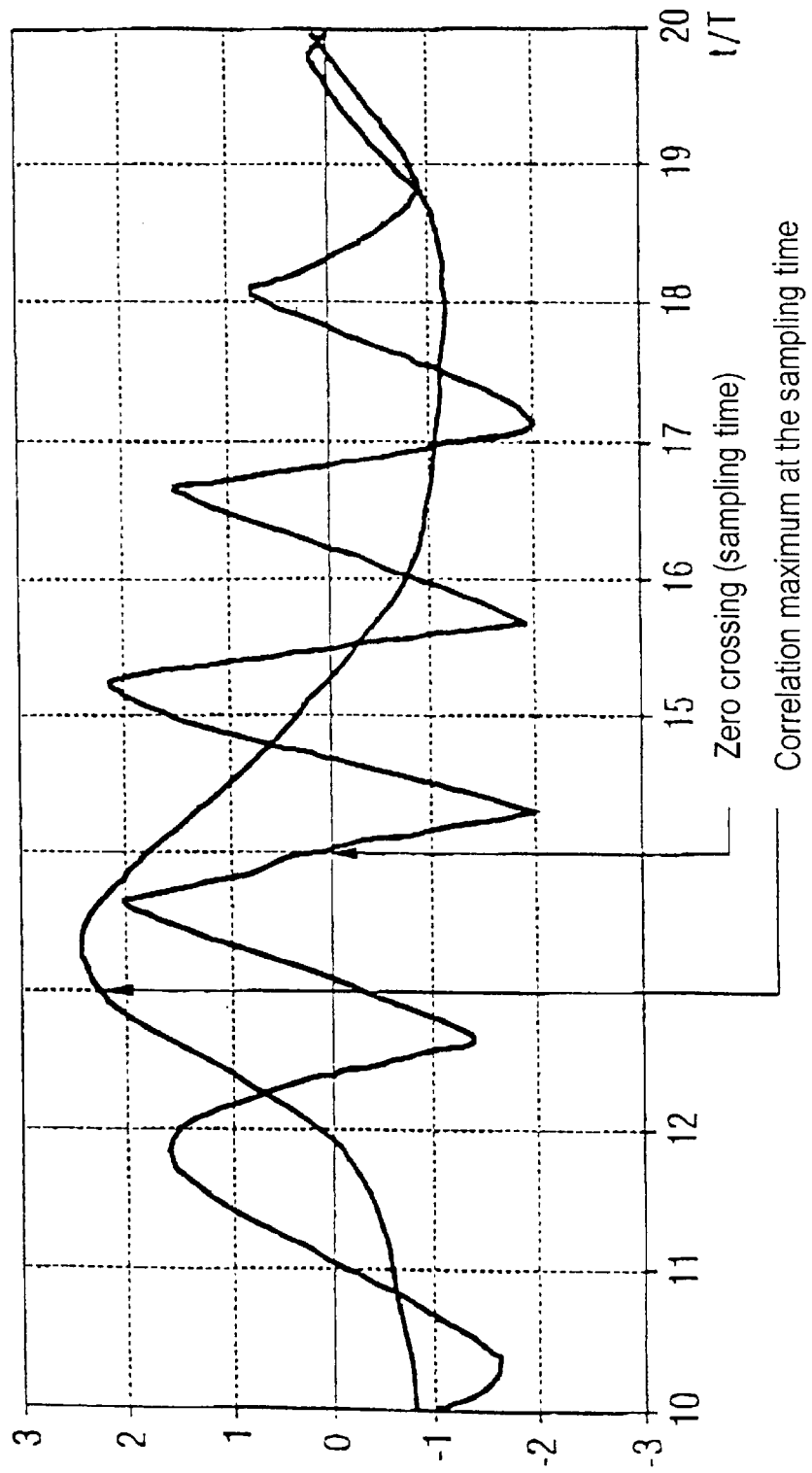
FIG. 14 is a graph showing the correlation sum and the clock control criterion modified according to the invention.

FIG. 14 shows the clock control criterion with n=5; m=1; $k_0$=⅛ and the correlation sum that is obtained on transmission through a 5.5 km AWG 26 line. As can be seen by comparison with FIG. 4, as in the case of the previous configuration, the zero crossing occurs one symbol period after the correlation maximum, but the mathematical sign of the gradient has been reversed, which can be corrected by corresponding inversion of the control signal. It also turns out that the control range is approximately ±0.75 T (internal until the next zero crossings). It is, thus, lower than with the previous configuration but is, nevertheless, still sufficient to ensure error-free synchronization.

The disturbances superimposed on the clock control criterion can in this case no longer be determined from the impulse response (symbol interference) or from the filter frequency responses of the subsystems (external and internal noise) due to the nonlinearity involved (magnitude formation). The individual elements must be determined by simulation.

Figure 15:
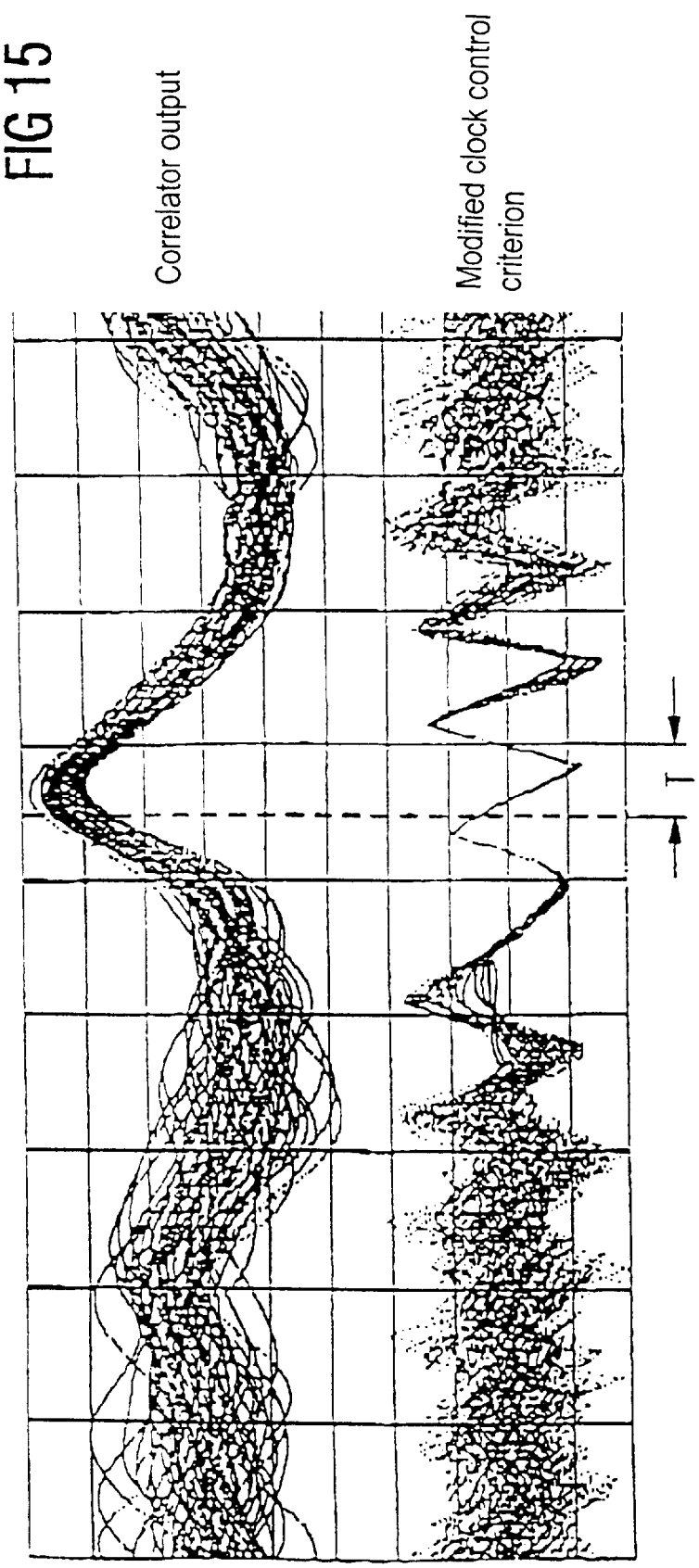
FIG. 15 is a graph showing the output of the correlator and of the clock control criterion modified according to the invention.

FIG. 15 shows the correlation sum output [lacuna] corr-elator and the modified clock control criterion, both obtained by simulation. In such a case, n=5, m=1, k=⅛ have been assumed for the clock control criterion filter 24, with transmission through a 5.5 km AWG 26 line being simulated. The influence of symbol interference on the zero crossing of the clock control criterion is likewise low in this case, as is shown by comparison with FIG. 9.

The influence of the external and internal disturbances must be determined by simulation.

Figure 16:
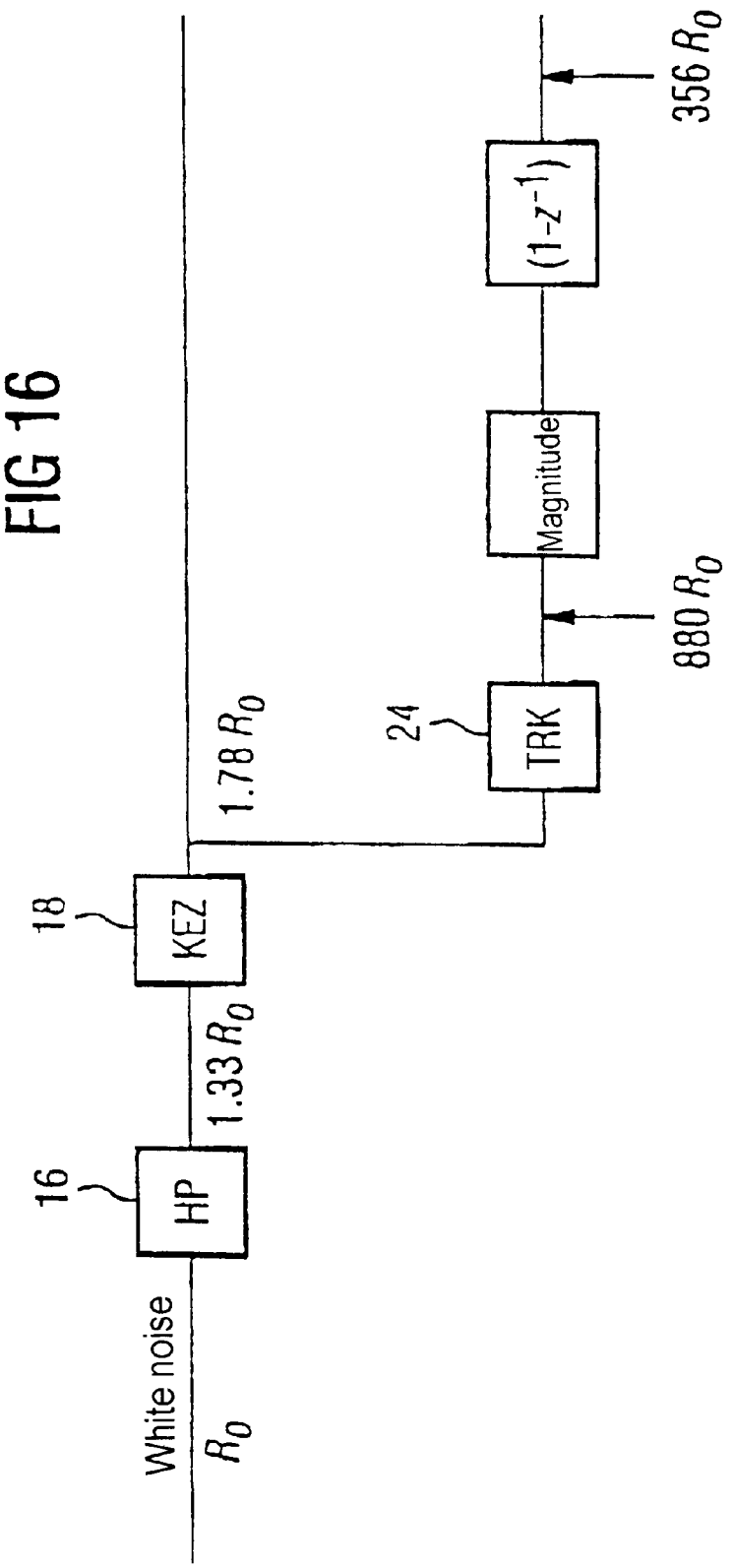
FIG. 16 is a block circuit diagram showing the noise powers at the output of the individual sub systems within the receiver modified according to the invention.

FIG. 16 shows the noise power levels at the output of the individual blocks within the receiver. This is based on a white noise source at the receiver input, with the spectral power density $R_0$. In such a case, n=5, m=1, $k_0$=⅛ has been assumed for the clock control criterion filter 24.

The example results in a noise gain of 356. The gradient of the control characteristic (zero crossing of the clock control criterion) is about 94, resulting in a value of about 5 for the comparison criterion $$F = \frac{2}{\sqrt{\frac{R}{R_0}}}$$

defined in the previous section. The previous solution results in a value of 1.78 with a noise gain of 3169 and a gradient of about 100. The improvement is, thus, about 9 dB.

Thus, according to the invention, the configuration as shown in FIG. 13 with $k_0=-\frac{3}{8}$ for long lines and $k_0=\frac{1}{8}$ for short lines is proposed for implementation of the clock control filter.

I claim:

1. An apparatus for controlling a sampling clock in a digital data transmission system, comprising:
   a clock control criterion filter for filtering a received, sampled, and filtered signal;
   an adjustment logic device;
   a switch supplying a clock control criterion to said adjustment logic device for a sampling clock;
   an apparatus for identification of a synchronization word transmitted at regular time intervals and for receiving the received, sampled, and filtered signal, said apparatus programmed to actuate said switch for controlling the sampling clock at a receiving end of a digital data transmission system;
   a magnitude formation circuit; and
   a high-pass filter, wherein said magnitude formation circuit and said high-pass filter are disposed between said clock control criterion filter and said adjustment logic device.

2. The apparatus according to claim 1, wherein said high-pass filter has a transfer function of $(1-z^{-1})$.

3. The apparatus according to claim 1, wherein said clock control criterion filter has a transfer function of $(1-z^{-1})^5 * (1-z^{-2})*(1-k_0 z^{-1})$.

4. The apparatus according to claim 3, wherein $k_0=-\frac{3}{8}$ for short lines and $k_0=\frac{1}{8}$ for long lines.

5. A method for controlling a sampling clock in a digital data transmission system, which comprises:
   transmitting a synchronization word at regular time intervals;
   controlling a sampling clock at a receiving end of a digital data transmission system by the transmission of the synchronization word;
   filtering a received, sampled, and filtered signal with a clock control criterion filter and, at the same time, subjecting the received, sampled, and filtered signal to a detection method for identification of the synchronization word;
   controlling an adjustment logic device for the sampling clock on identification of the synchronization word with an output value of the clock control criterion filter; and
   forming a magnitude of the output value of the clock control criterion filter and subjecting the magnitude to high-pass filtering before supplying the magnitude to the adjustment logic device.

6. The method according to claim 5, which further comprises subjecting the magnitude to high-pass filtering with a transfer function of $(1-z^{-1})$.

7. The method according to claim 5, which further comprises providing the clock control criterion filter with a transfer function of $(1-z^{-1})^5 * (1-z^{-2})*(1-k_0 z^{-1})$.

8. The method according to claim 7, which further comprises setting a value for $k_0$ to $-\frac{3}{8}$ for short lines and $+\frac{1}{3}$ for long lines.

9. An apparatus for controlling a sampling clock in a digital data transmission system, comprising:
   a clock control criterion filter for filtering a received, sampled, and filtered signal at a receiving end of a digital data transmission system;
   an apparatus for identifying a synchronization word transmitted at regular time intervals at a receiving end of a digital data transmission system;
   an adjustment logic device;
   a switch supplying a clock control criterion to said adjustment logic device for a sampling clock, said apparatus actuating said switch based upon the transmission of the synchronization word;
   a magnitude formation circuit; and
   a high-pass filter, wherein said magnitude formation circuit and said high-pass filter are disposed between said clock control criterion filter and said adjustment logic device.

10. A method for regulating a sampling rate in a data transfer system, which comprises:
    transmitting a synchronizing word used for receiver-side regulation of the sampling rate;
    filtering a received signal with a rate-regulating criterion filter and simultaneously detecting the received signal to recognize the synchronizing word;
    controlling an adjusting logic for the sampling rate once the synchronizing word is recognized with an initial value of the rate-regulating criterion filter;
    forming a rate for the initial value of the rate-regulating criterion filter; and
    performing high pass filtering of the rate before the rate is fed to the adjusting logic.

* * * * *

UNITED STATES PATENT AND TRADEMARK OFFICE
CERTIFICATE OF CORRECTION

PATENT NO.   : 6,714,613 B2
DATED        : March 30, 2004
INVENTOR(S)  : Heinrich Schenk It is certified that error appears in the above-identified patent and that said Letters Patent is hereby corrected as shown below:

Title page,
Item [63], Related U.S. Application Data, should read as follows:
-- Continuation of application No. PCT/DE99/02758, filed on Sep. 1, 1999. --

Signed and Sealed this

Seventeenth Day of August, 2004

JON W. DUDAS
*Acting Director of the United States Patent and Trademark Office*